April 19, 1938.　　　　L. A. CAMEROTA　　　　2,114,975
METHOD OF COATING PIPES
Original Filed March 4, 1936　　　9 Sheets-Sheet 1
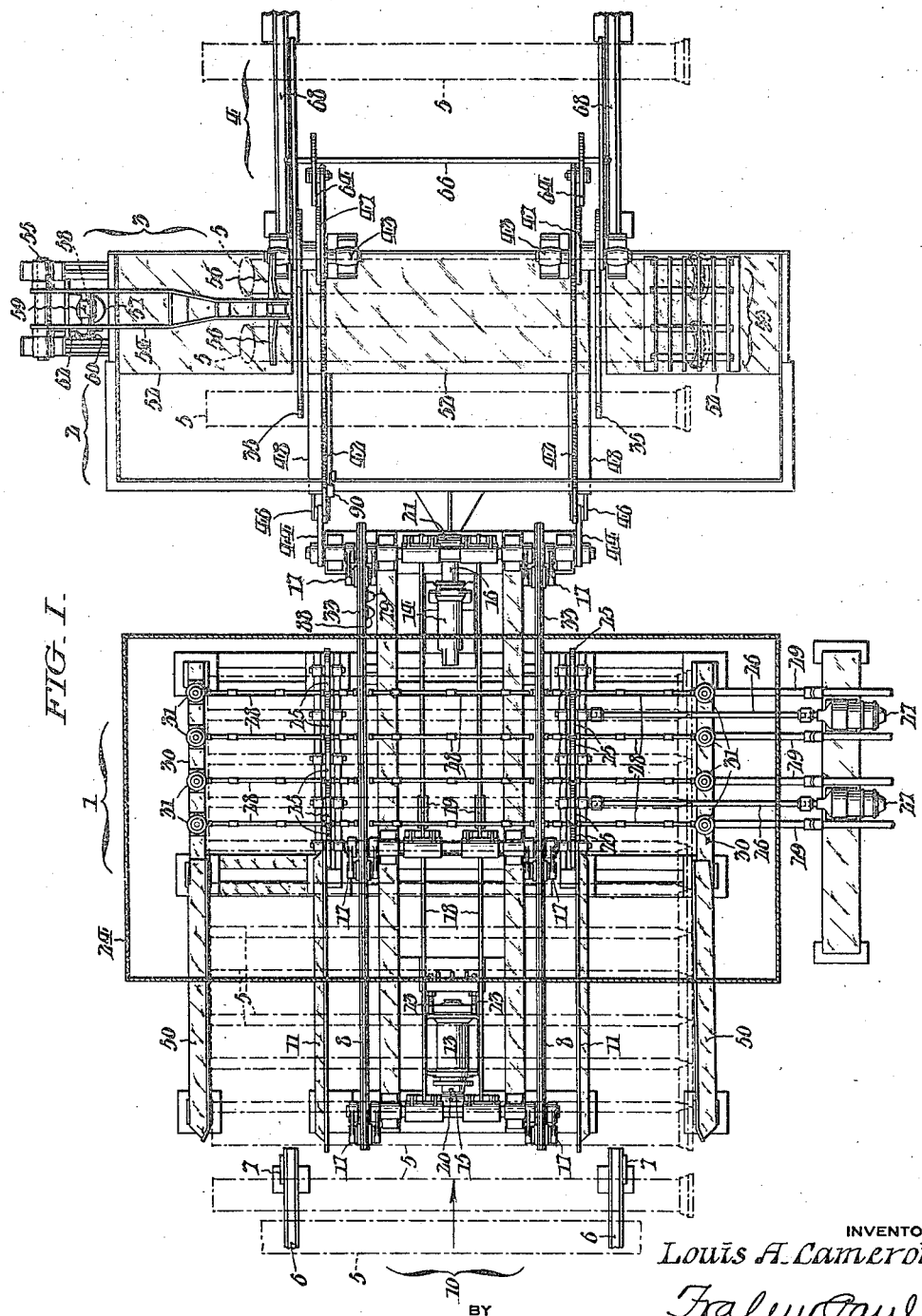
INVENTOR
Louis A. Camerota
BY
Fraley Paul
ATTORNEYS

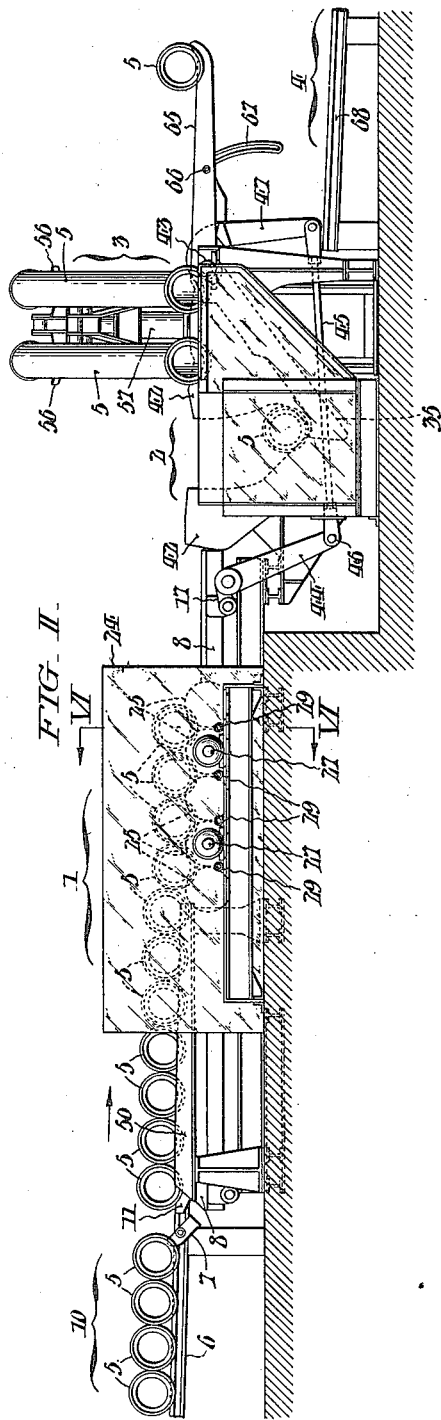

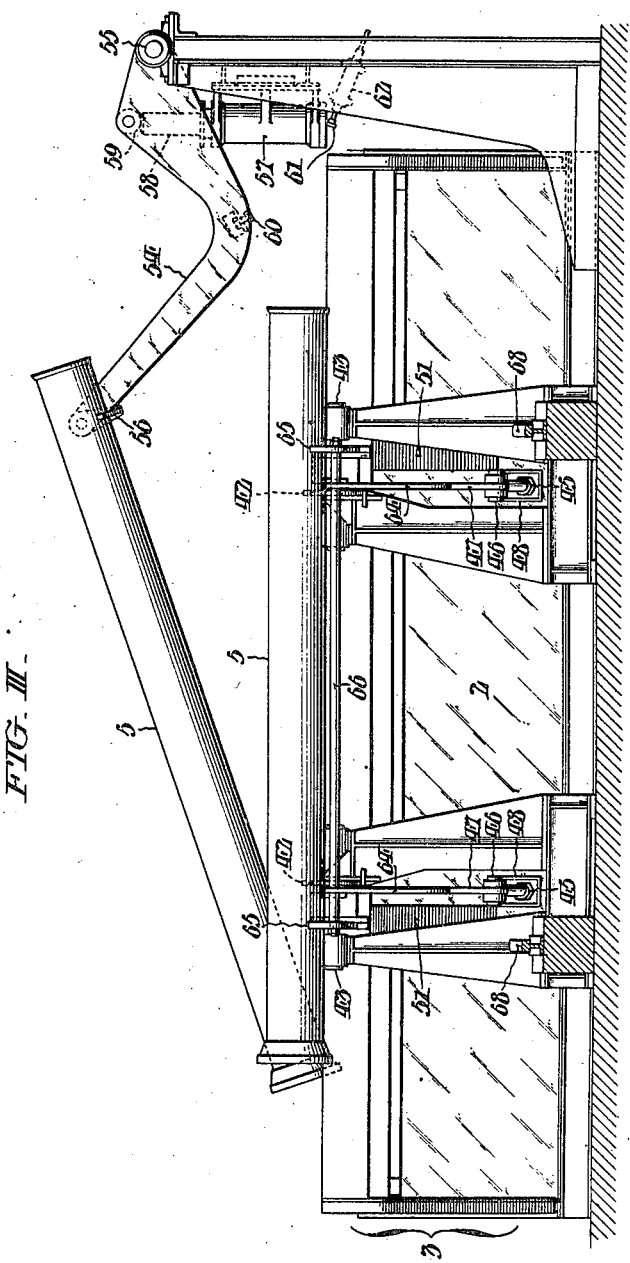

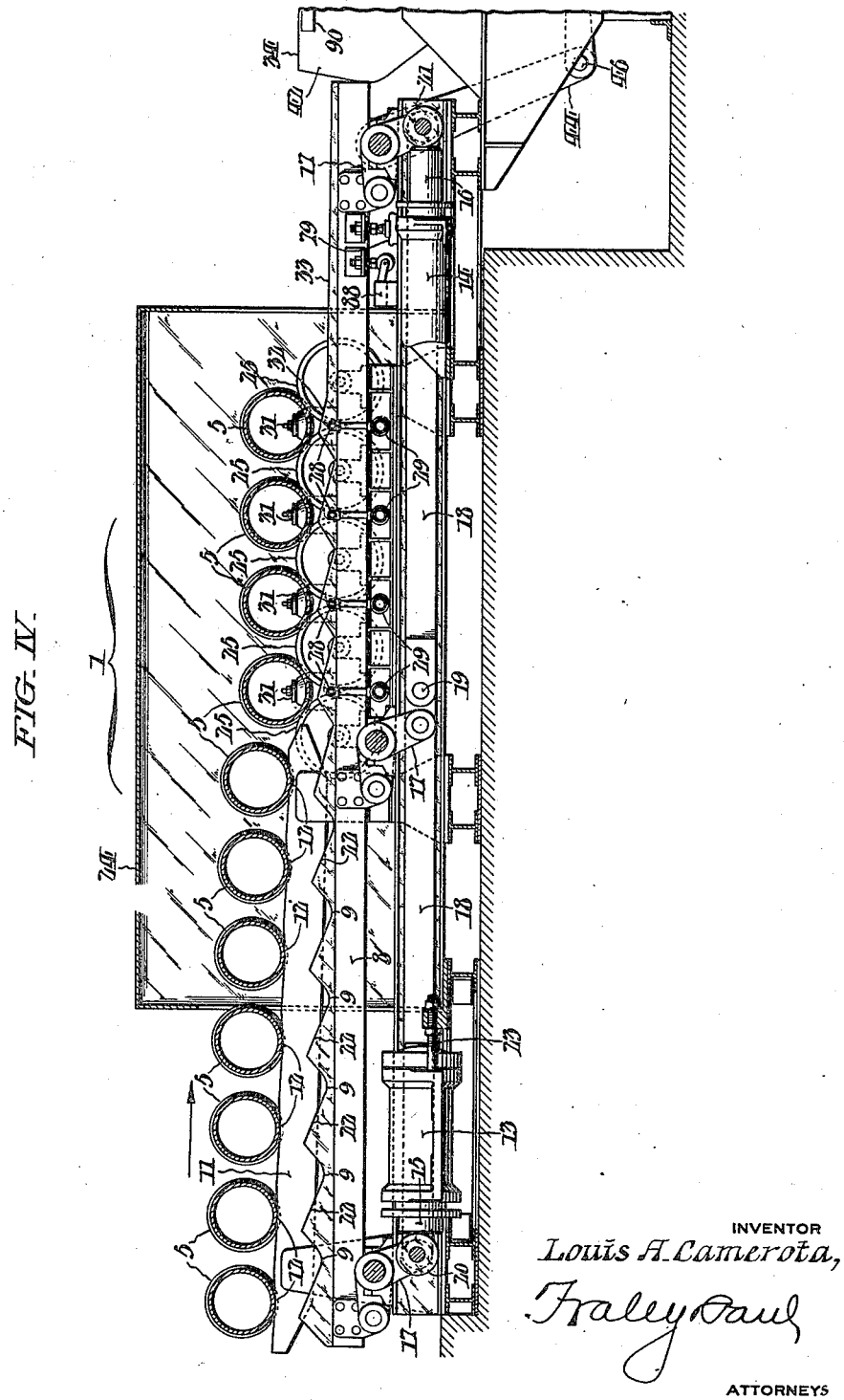

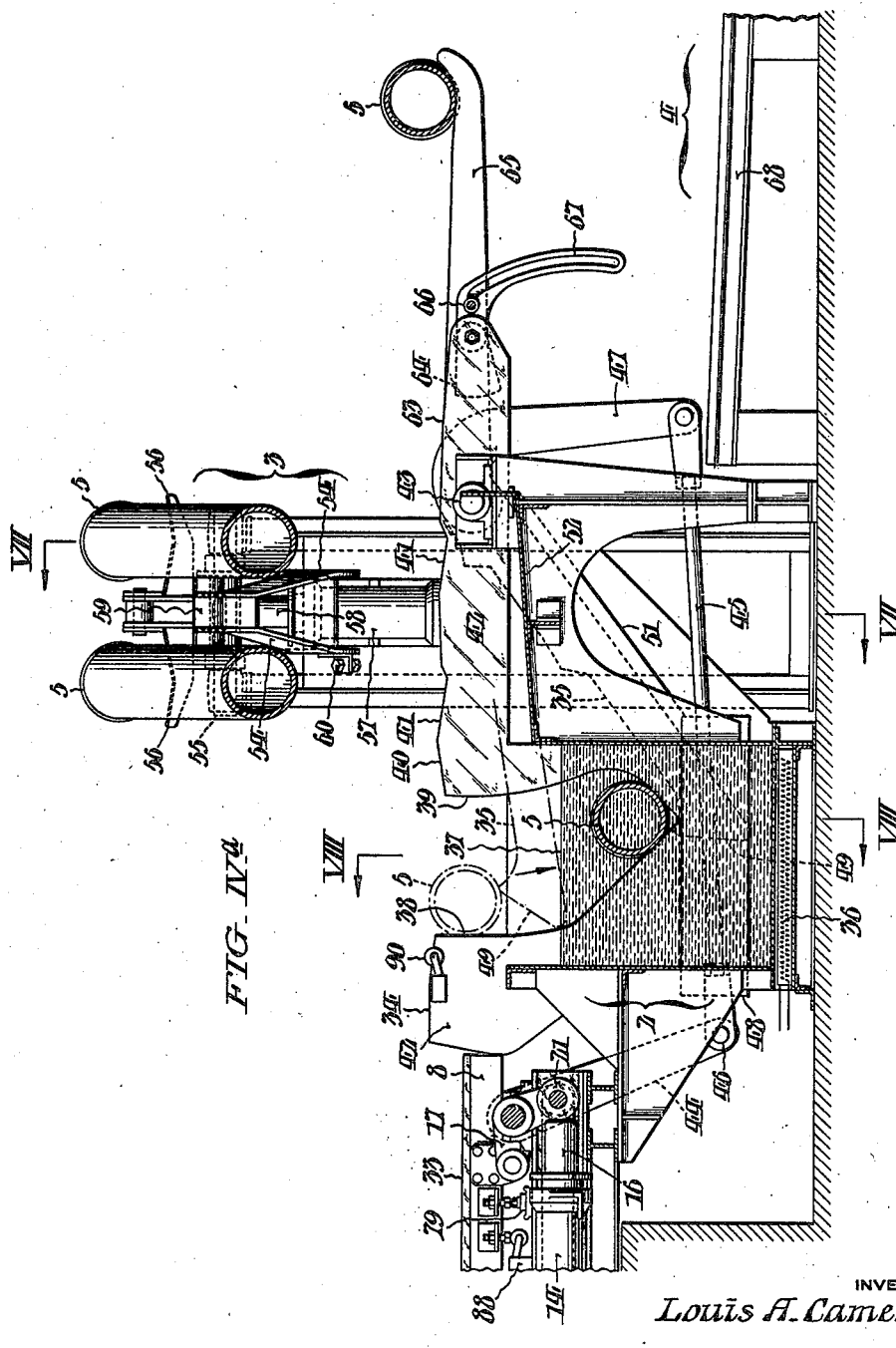

April 19, 1938. L. A. CAMEROTA 2,114,975
METHOD OF COATING PIPES
Original Filed March 4, 1936 9 Sheets-Sheet 6
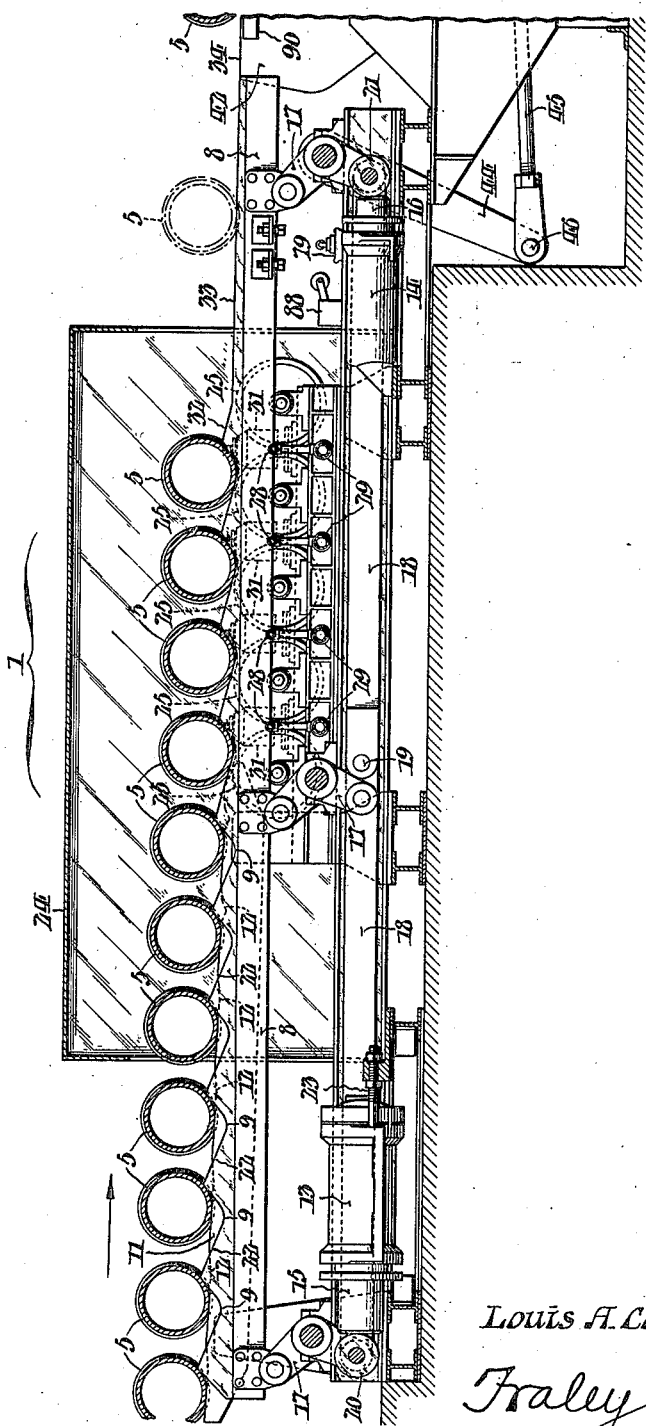
INVENTOR
Louis A. Camerota,
Fraley Paul
ATTORNEYS

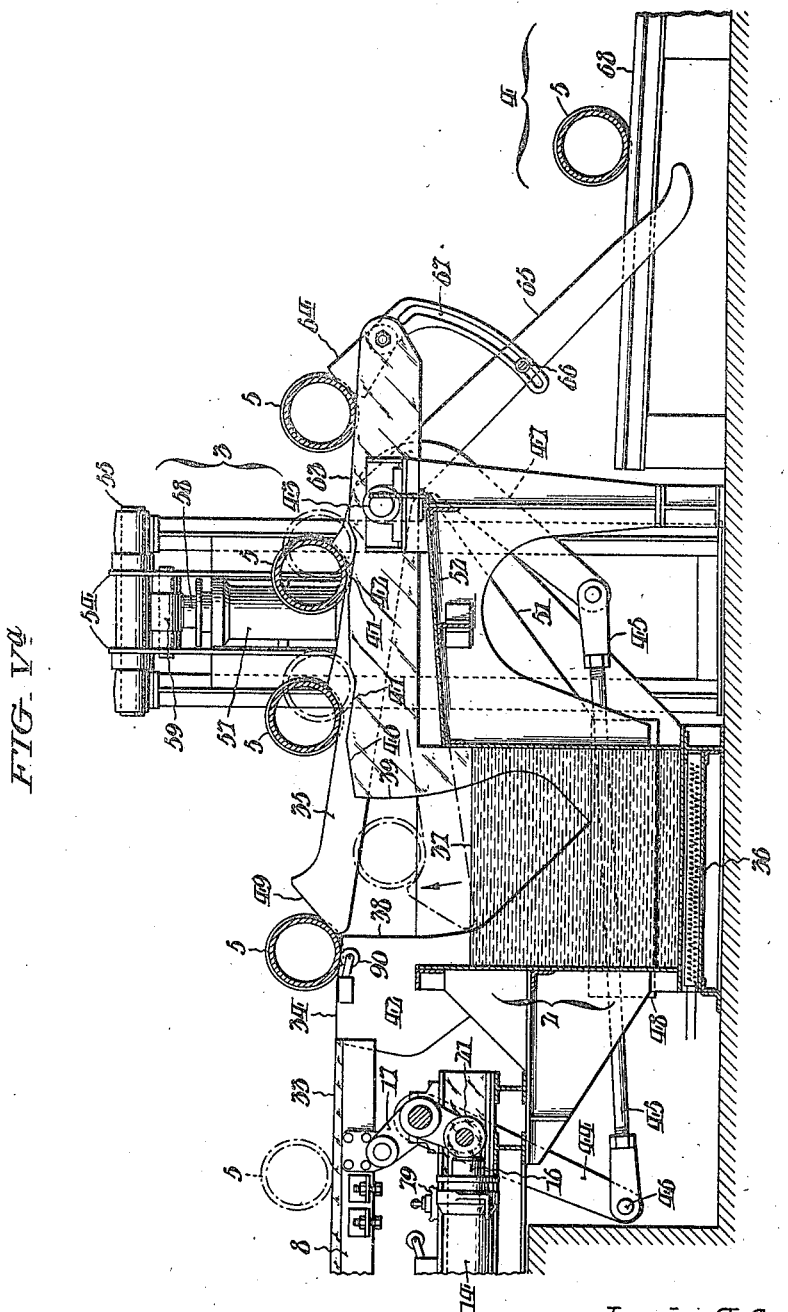

April 19, 1938. L. A. CAMEROTA 2,114,975
METHOD OF COATING PIPES
Original Filed March 4, 1936 9 Sheets-Sheet 8
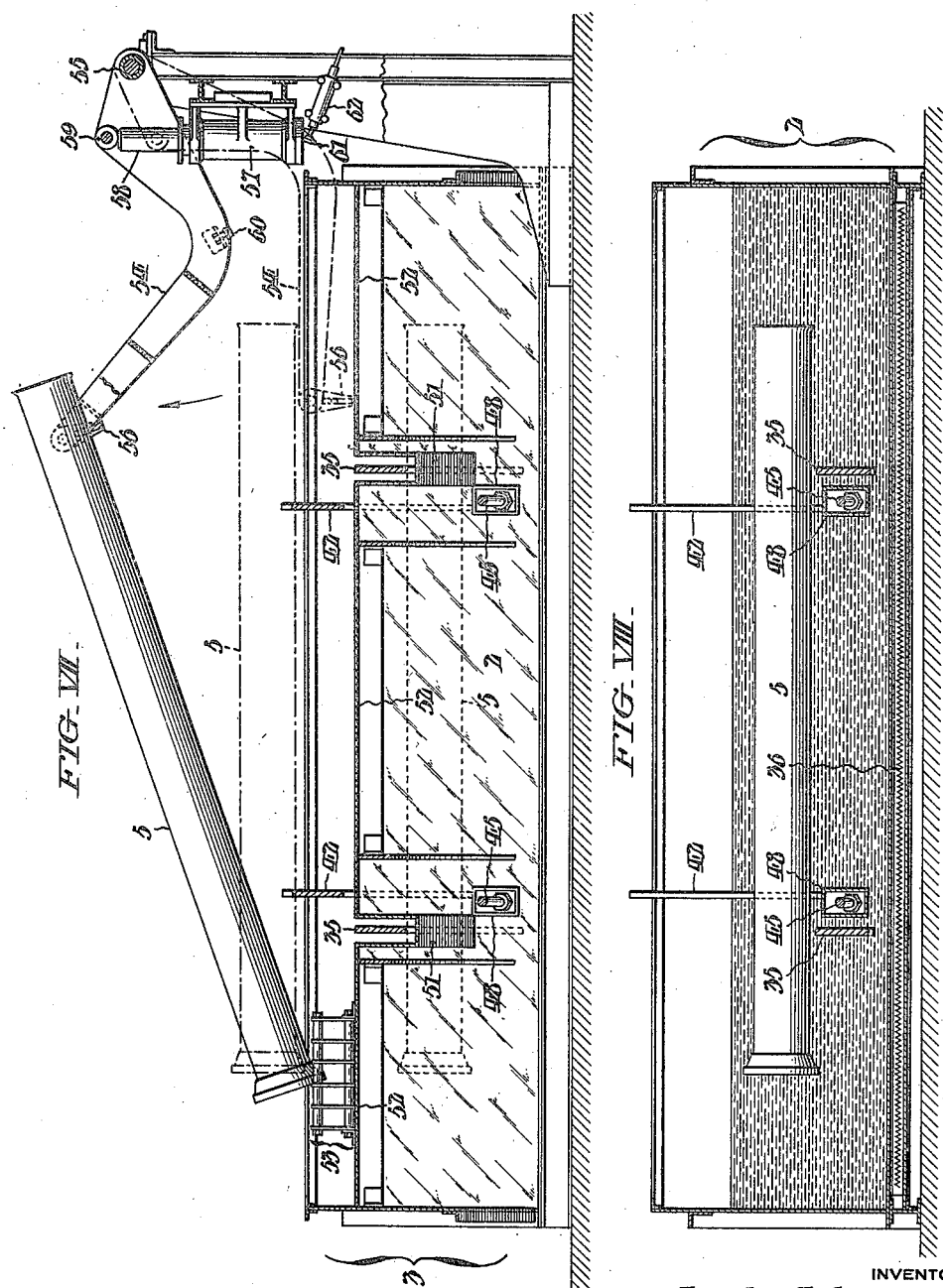
INVENTOR
Louis A. Camerota,
BY
ATTORNEYS.

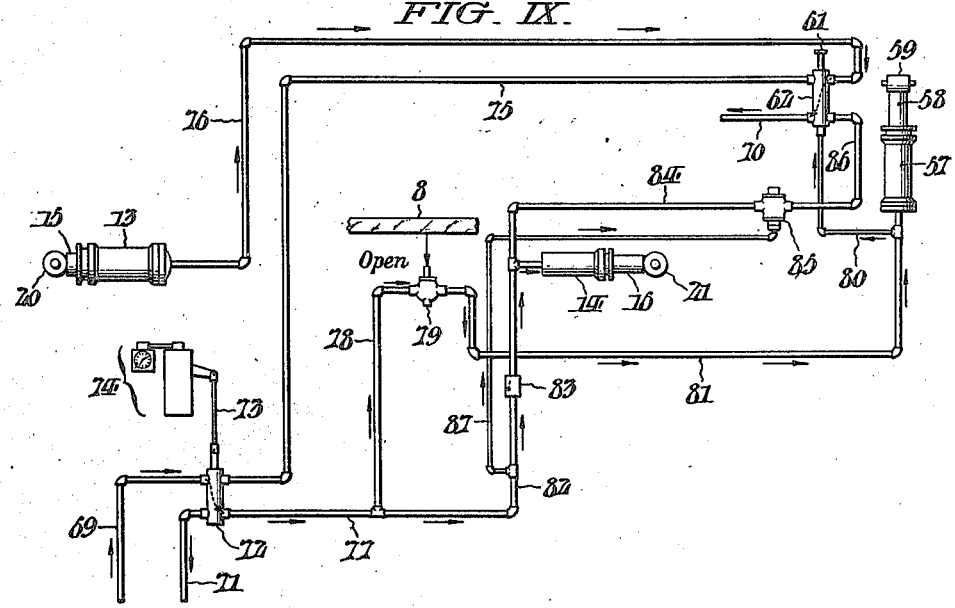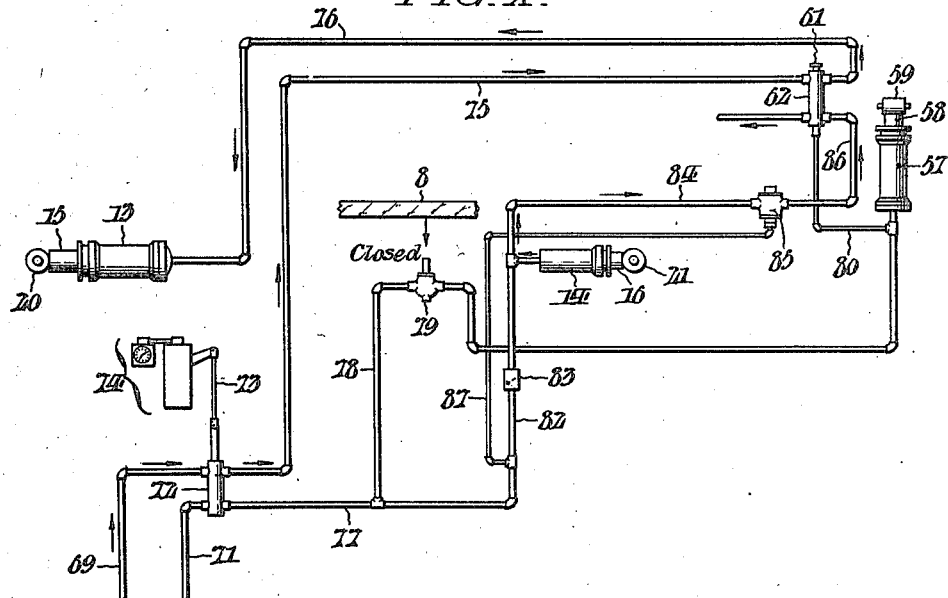

Patented Apr. 19, 1938

2,114,975

UNITED STATES PATENT OFFICE 2,114,975

METHOD OF COATING PIPES

Louis A. Camerota, Burlington, N. J., assignor to Florence Pipe Foundry & Machine Company, Florence, N. J., a corporation of New Jersey Original application March 4, 1936, Serial No. 67,018. Divided and this application August 7, 1936, Serial No. 94,755

7 Claims. (Cl. 91—70)

This invention relates to the coating of hollow cylindrical articles which are herein classified generally as "pipes", and while capable of a variety of applications, the invention is particularly useful as applied to the coating of cast iron pipes with bituminous material. This application is a division of my pending application for U. S. Letters Patent, Serial No. 67,018, filed March 4, 1936.

It has heretofore been common practice among pipe manufacturers to coat their products by a batch method involving two consecutive immersions of the pipe in a bituminous coating material, and specifications for the manufacture of pipe which have been adopted by certain associations have required two such immersions of the pipe in the coating material, it being the belief of many engineers that in this manner the coating can be made to adhere more tenaciously to the pipe. One of the objects of my invention is to provide a method of coating pipes which involves only one immersion of the pipe in the coating material, and yet produces a coating which will better adhere to the surface of the pipe and will not chip, flake, or crumble.

A further object of the invention is to provide a method, fully automatic in its operation, for conveying a series of pipes with step-by-step progression through a heating station, into and out of a vat containing the coating material, and then through a draining station at which the pipes are drained of excess coating material, the machine being characterized by its capacity to coat a large number of pipes efficiently, economically, and thoroughly, in the shortest possible space of time and with a minimum of attention on the part of the operator.

A further object of the invention is to provide a method of coating which involves guidedly moving the pipes in succession into and out of a vat containing the coating material, such movement preferably being accompanied by rotation of the pipes so as to distribute and spread the coating material from end to end with avoidance of air pockets, and such operation being timed in relation to the movement of the pipes through the heating station whereby each pipe is uniformly heated to a predetermined temperature before immersion in the vat of coating material.

Numerous other objects and advantages characteristic of my present invention will become more fully apparent from the description hereinafter set forth of one example of the practice of the invention, having reference to the accompanying drawings.

Of the drawings:

Fig. I represents a plan view of a pipe coating apparatus of my invention, with the series of pipes passing through the apparatus shown in dot-and-dash lines.

Fig. II represents a side elevation of the same, with the pipes shown in full lines.

Fig. III represents an end elevation, showing in particular the mode of operation of the tilting device by which the pipes are drained of excess coating material.

Fig. IV represents a vertical cross section, taken substantially centrally of the machine, and showing an enlarged view of the heating station and the manner in which the pipes are conveyed through such station.

Fig. IV—A represents a view constituting an extension of Fig. IV, showing the vat containing the coating material and the apparatus for tilting the pipes after removal from the vat.

Fig. V represents a view similar to Fig. IV, but showing the pipe conveyor in a different stage of its operations.

Fig. V—A represents a view constituting an extension of Fig. V, showing the apparatus in a different stage of the operation of the machine from that shown in Fig. IV—A.

Fig. VI represents a cross section, taken transversely of the machine, as indicated by the lines VI—VI of Fig. II.

Fig. VII represents a cross section, taken transversely of the machine, as indicated by the lines VII—VII of Fig. IV—A.

Fig. VIII represents a cross section taken transversely of the machine, as indicated by the lines VIII—VIII of Fig. IV—A; and, Figs. IX and X represent diagrammatic views of the pressure lines, valves, and other instrumentalities for controlling the operation of the machine, showing different conditions of operation.

With reference to Figs. I and II of the drawings, the machine of this invention comprises, generally, a supply station comprehensively designated at 10, a heating station similarly designated at 1, a vat containing the coating material similarly designated at 2, a draining station where the pipes are drained of excess coating material similarly designated at 3, a discharge station similarly designated at 4, and conveying means for transferring the pipe horizontally and with step-by-step progression through the series of stations.

As shown most clearly in Fig. II, the pipes 5 are conveniently brought to the coating machine by causing them to roll on spaced parallel rails 6 elevated above the floor of the foundry. At the supply station 10 a check device 7 pivoted to the rails 6 may be employed as a safeguard against accidental rolling of the pipes onto the conveying means hereinafter described.

The pipes received at the supply station are admitted one at a time to a conveyor comprising a pair of spaced parallel skids 8 having notches 9 at regular intervals therealong. As shown most clearly in Figs. IV and V, the skids 8 are adapted to be raised and lowered, and operate in conjunction with stationary rails 11 to convey the pipes 5 with step-by-step progression to the heating station 1. Each rail 11 has on its upper surface a series of depressions 12, which serve to maintain the pipes 5 at spaced intervals apart when the skids 8 are lowered. In the illustrated example, the operation of the reciprocating skids 8 is accomplished by means of an elevating cylinder 13 and a lowering cylinder 14 located at the base of the machine and suitably supported on a structural framework, the nature of which is clearly illustrated in the drawings. The pressure cylinders 13, 14 have plungers 15, 16, respectively, which operate simultaneously and in opposite directions under automatic control, which is more fully described hereinafter. Three pairs of bell crank levers 17 pivotally mounted on the framework of the machine serve to transmit the movement of the plungers 15, 16 to the notched skids 8. All of the bell crank levers 17 are interconnected by bars 18 conveniently made in two sections and joined together at 19. The arms of the sets of bell crank levers 17 disposed at each end of the framework are provided with rollers 20, 21 for engagement with the heads of the plungers 15, 16. As each skid 8 is raised above the level of the rails 11, the inclined surfaces 22 leading forwardly and downwardly to the notches 9 engage all of the pipes on the rails 11, and cause such pipes to roll in the direction indicated by the arrow towards the heating station 1. Preferably the pipes 5 are not bodily lifted above the rails 11, but are rolled in contact with said rails and hence the amount of power required for moving the pipes is reduced. With each complete reciprocation of the skids 8 each pipe is moved forwardly a predetermined distance along the rails 11 equal to the space between the notches 9. During the upward movement of the skids 8, each pipe is raised out of its seat formed by depressions 12 in the rails 11 and caused to roll forwardly, and during the downward movement of the skids, each pipe rolls a further distance along the rails until it reaches the next seat formed by the depressions 12. In order to insure the proper operation of the pressure cylinders 13, 14 the elevating cylinder 13 is rendered adjustable in its position on the framework of the machine with respect to the lowering cylinder 14, this being accomplished by threaded adjusting rods 23, clearly shown in Figs. IV and V. As the pipes 5 are progressed by the conveyor skids 8, they are guided between flanged guide members 50 which prevent endwise movement of the pipes.

Operation of the notched skids 8 causes the pipes 5 to be conveyed with step-by-step progression to positions within a hood 24 which houses the heating apparatus. Within the hood 24 in substantial alignment with the rails 11 are disposed sets of rollers 25 driven through shafts 26 by motors 27, shown most clearly in Fig. I. The pipes 5 are transferred horizontally and in spaced parallel relation to each other from one set of rollers to another by means of the reciprocating skids 8. With each complete reciprocation of the skids 8 each pipe is raised from its position between a set of rollers 25, is lifted above the top level of said rollers, is caused to roll forwardly on the inclined surface 22 of the skids 8, and is thus carried to the next set of rollers. At the heating station 1, during the pause in the movement of the conveyor, a number of pipes (four in the illustrated example) are rotated on the rollers 25 for a predetermined length of time. At each set of rollers, a heating flame is provided as most clearly shown in Fig. VI. One convenient manner of heating the pipes while thus rotating on the rollers 25 consists in utilizing gas pipes 28 disposed horizontally beneath the pipes and receiving their supply of gas from a common supply line 29. It is found that the application of heat to pipes rotating in this manner produces a uniform heating of each pipe throughout the length thereof, and this is a factor which is very important in insuring that the coating material will adhere tenaciously to the entire surface of the pipe. While the pipes are thus rotating at the heating station 1, they are restrained against endwise movement by means of rollers 31 mounted on sills 30 and rotating about vertical axes and adapted to engage respectively the bell and bead ends of the pipes.

In the illustrated example, four heating stages are provided at the heating station 1, each pipe being transferred successively from one heating stage to the other. The heating is so regulated, by controlling the length of time that the pipes are rotated at each stage and by controlling the intensity and position of the heating flame, that at the completion of the final heating stage the pipe is raised to a temperature which is substantially equal to that of the coating material in the vat 2. Upon the assumption that the pipes are to be coated with a bituminous substance such as refined coal tar or the like, in order to gain the proper affinity between the pipe surfaces and the coating material, as well as to reduce the viscosity of such material, the vat 2 should be heated to a high temperature. The best results are obtained when the temperature to which the coating material is heated is just below the point at which its volatile constituents are volatilized, and I have found that the pipes should be heated to approximately the same temperature and that the heating should be carefully regulated as well as uniformly applied in order to effect the desired affinity between the surface to be coated and the coating material. Inasmuch as each pipe must remain in the vat 2 for a certain length of time to receive its coating, this period of time has been selected to govern the duration of the pause of the conveyor and hence to govern the period of each heating stage at the heating station 1. To obtain the maximum production for the machine, the number of heating stages and the degree of heat applied is predetermined so that at the completion of the final heating stage the pipe is raised to approximately the temperature of the coating material, and each pipe remains in the vat for a sufficient period for it to absorb a thorough coating, and no longer.

After a pipe 5 has passed through the last heating stage, the elevation of the notched skids 8 causes the pipe to roll down an abruptly inclined surface 32 to a more gradually inclined surface 33 to the extreme ends of the skids. Beyond the ends of the skids, as shown most clearly in Fig. V—A, the pipes 5 are rolled onto supporting surfaces 34 where they are temporarily arrested by the ends 49 of a pair of pipe-carrying fingers 35, preparatory to immersion in the vat 2.

As clearly shown in Figs. IV—A, V—A, VII, and VIII, the vat 2 is in the form of a rectangular tank suitably braced and supported, and has at the base thereof a heating element 36 which preferably extends throughout the entire length and breadth of the vat and is so regulated as to heat the coating material, the normal level of which is represented at 37, to the desired predetermined temperature. Leading downwardly from the supporting surfaces 34 into the coating material of the vat 2 are guiding surfaces 38 upon which the pipes 5 are adapted to roll to a fixed position within the vat. Leading upwardly from this point of the vat are additional guiding surfaces 39, and beyond the surfaces 39 there are additional pipe supporting surfaces 40 disposed in a substantially horizontal plane and having spaced notches 41 therein. All of the guiding and supporting surfaces 34, 38, 39, 40, 41 are conveniently formed by means of a pair of plates 42 disposed transversely of the vat 2 in spaced parallel relation. Desirably, the plates 42 are formed in such manner as not to interfere with flow of the coating material from one end of the vat 2 to the other.

In order to effect the rolling of the pipes 5 into the vat 2 with guided and controlled movement, the pipe-carrying fingers 35 are pivotally mounted at 43 and are operated in timed relation with the conveyor skids 8. To effect such operation, there are provided in association with the bell cranks 17 at the discharge end of the conveyor, crank arms 44 which pivotally join connecting rods 45 at 46. At the opposite end of the connecting rods 45, there are additional crank arms 47 which connect with and control the swinging movement of the pipe-carrying fingers 35. The connecting rods 45 pass through conduits 48 in the lower portion of the vat 2, out of contact with the coating material, as shown most clearly in Fig. VII. It will be observed, as shown in Fig. V—A, that when the conveyor skids 8 are fully elevated, the pipe-carrying fingers 35 are also fully elevated. As the skids 8 are lowered, the pipe carrying fingers 35 are also lowered with their ends 49 guiding the pipe which has arrived at that station downwardly along the inclined surfaces 38 leading into the vat 2. The manner in which the pipe-carrying fingers 35 thus guide the pipes into the vat 2 is clearly shown in Fig. IV—A, in which successive positions of the fingers 35 are represented in dot-and-dash lines. When a pipe 5 has reached its lowermost position within the vat 2, it remains there until the conveyor skids 8 are again elevated. With the elevation of the conveyor skids, the pipe is lifted by the fingers 35 and removed from the vat 2. The ends 49 of the lifting fingers 35 and the guiding surfaces 38, 39 are so formed that the pipes are caused to roll as they descend into the coating material and to roll again as they are raised by the pipe carrying fingers 35.

Such rotation of the pipes within the vat 2 is desirable because it assists materially in causing the coating material to be well distributed over all surfaces of the pipe in the tank. As a hollow pipe descends into a tank containing viscous material, there is a tendency for voids or air pockets to be formed, and I have found that by turning the pipes in the manner described, such tendency is avoided, the stirring up of the coating material by the rotation of the pipes causing the material to spread rapidly over the entire surface of the pipe. The immersion of the pipes one by one in the vat 2, each pipe being maintained for a predetermined length of time at a fixed position within the coating material and each pipe being rolled within the tank in the manner described, insures uniformity of treatment and assists materially in causing the coating material to adhere tenaciously to the entire surface of the pipe.

After immersion in the vat 2, the pipe is carried upwardly and caused to roll along the top edges of the pipe-carrying fingers 35 to a position above the first notch 41 of the supporting surfaces 40. At the completion of a subsequent cycle of operation, the pipe-carrying fingers 35 carry the same pipe to the second notch 41 of the supporting surfaces 40.

To accommodate the pipe-carrying fingers 35, the vat 2 is formed at one side thereof with triangular shaped extensions 51 of channel shaped cross section. At the draining station 3, there is also provided an inclined plate 52 leading downwardly toward the vat 2 and over which excess coating material drained from the pipes is caused to return to the vat. Desirably also at the draining station 3, there is provided, as clearly shown in Figs. I and VII, a rack 53 comprising a series of spaced plates serving to prevent endwise slipping of the pipes when inclined by means of the tilting device hereinafter described. The rack 53 is disposed above the inclined plate 52, and when the pipe is angularly inclined by raising the bead end, the bell end is caught in the rack, and the excess of coating material flows downwardly onto the plate 52 and from thence into the vat 2.

The tilting device for inclining the pipes at an angle to the horizontal position is shown most clearly in Figs. III, IV—A, and VII. The device comprises and L-shaped arm 54 pivoted at 55 to the stationary framework of the machine, and having a saddle 56 at its free end adapted to accommodate a pair of pipes. The tilting arm 54 is moved about its fulcrum 55 by a pressure cylinder 57, conveniently termed "the pipe draining cylinder". The pipe draining cylinder 57 is supported vertically on the framework of the machine and has a plunger 58, the head of which engages a roller 59 on the tilting arm 54. In an obvious manner, vertical movement of the plunger 58 controls the angular position of the tilting arm 54. The position of maximum elevation is represented in full lines in Fig. VII, whereas the lowermost position of the tilting arm is there shown in dot-and-dash lines. Near the elbow of the tilting arm 54 there is provided an abutment 60 adapted to engage and disengage the valve rod 61 of a valve 62 which controls the operation of the elevating cylinder 13. Each pipe received at the draining station 3 is inclined by the tilting arm 54 on two successive occasions. On the first occasion the pipe is supported by one arm of the saddle 56, and on the second occasion by the other arm of the saddle. The particular manner in which the tilting mechanism is operated in timed relation to the movement of the conveyor is described more fully in connection with the automatic controls.

After a pipe has been tilted and drained at the draining station 3, the upward movement of the pipe-carrying fingers 35 causes it to roll along the surfaces 63 of the plates 42 to a position near the end of such surfaces, as shown in Fig. V—A, where it is momentarily arrested by means of swinging stop devices 64. When the pipe-carrying fingers 35 again descend into the vat 2, lowering arms 65 connected with the fingers 35 and pivoted at 43 move upwardly to the positions represented in Fig. IV—A. The lowering arms 65 have thereon rods 66 engaging within arcuate slots 67 or curved portions of the swinging stop devices 64. In an obvious manner, as the lowering arms 65 are raised, the stops 64 are depressed beneath the surfaces 63, and the pipe previously arrested by the stops is then allowed to roll along the lowering arms 65 to the ends thereof as indicated in Fig. IV—A. The extreme ends of the lowering arms 65 are curved upwardly to limit the movement of the pipe carried thereon. When the lowering arms 65 descend, the pipe carried at the ends thereof is lowered and deposited on parallel rails 68 at the discharge station 4. Desirably the rails 68 at the discharge station are inclined downwardly to allow the pipes to roll therealong.

The mechanism for controlling the operation of the pipe coating apparatus is diagrammatically illustrated in Figs. IX and X. The pressure supply line is therein designated at 69, and exhaust lines are designated at 70, 71. The pressure medium is supplied through a four-way, master control valve 72 having a valve rod 73 which is actuated by an automatic timing device 74. At predetermined intervals of time, the interval being governed by the time required for immersion of a pipe in the vat to coat the same, the valve rod 73 is raised by action of the automatic timing device 74. This allows the pressure medium to pass from the supply line 69 to a pipe line 75. From thence the pressure medium passes to the four-way, conveyor control valve 62, which governs the operation of the elevating cylinder 13. The conveyor control valve 62 is actuated by the valve rod 61 at the draining station. The valve rod 61 occupies the position represented in Fig. IX, when the tilting device 54 is raised, the valve rod being maintained in this position by pressure in the pilot line 80. On the other hand, when the tilting arm 54 is lowered, the abutment 60 thereon strikes the valve rod 61, reversing the valve 62 to the position indicated in Fig. X. From the conveyor control valve 62 a pressure line 76 leads to the elevating cylinder 13 which controls the elevation of the conveyor skids 8.

Leading from the master control valve 72 there is an additional pressure line 77 having two branches, one such branch 78 leads through a balanced stop valve 79 and thence through a pressure line 81 to the pipe draining cylinder 57. Another branch 82 leads through a check valve 83 to the lowering cylinder 14, which controls the lowering of the skids 8. From the pipe draining cylinder 57 the pilot line 80 leads to the conveyor control valve 62. From the lowering cylinder 14 there is an exhaust line 84 leading through a pilot controlled stop valve 85, and thence through a line 86 to the conveyor control valve 62. The balanced stop valve 79 is opened and closed by movement of the conveyor skids 8. When the skids 8 are lowered, this valve 79 is open, and when the skids 8 are raised, this valve is closed. The pilot control valve 85 has a spring therein which tends to maintain the valve in open position. The action of this spring is opposed by pressure in a pilot line 87 which by-passes the check valve 83 and joins the pressure line 82.

In addition to the above described apparatus for controlling the operation of the various pressure cylinders of the machine, there is also provided an electrical control for the operation of the motors 27 which drive the rollers 25. It being desired to start the motors 27 as soon as the conveyor skids 8 are lowered, a switch 88 is provided, as shown in Figs. I–IV and V, which serves to close the circuit to the motors 27 just before the conveyor skids 8 reach their lowermost positions. The same door switch 88 serves to open the circuit and stop the motors 27 immediately after the conveyor skids 8 commence to elevate. There is also provided a similar type of control switch 90 disposed adjacent to the pipe-supporting surface 34 at the entrance to the vat 2. The purpose of the switch 90 is to reverse the master control valve 72 when the conveyor skids 8 have reached their maximum elevation, and when each pipe has been rolled to the next succeeding position in its line of travel. Thus when a pipe has reached the entrance to the vat 2, all is in readiness for the conveyor skids 8 to return to lowered position, and such return is accomplished by the operation of the switch 90 which actuates a motor in the automatic timing device 74 to reverse the position of the master control valve 72.

The operation of the coating apparatus herein described and illustrated is as follows:

Upon the assumption that the conveyor skids 8 are lowered, and that the apparatus is in the position shown in Figs. IV and IV—A, four of the pipes being rotated on the rollers 25, one of the pipes being immersed in the vat 2, and two of the pipes being inclined at the draining station 3 by the tilting device 54, the flow of pressure in the various pipe lines is as illustrated in Fig. IX. At this point pressure is supplied through the supply line 69, the master control valve 72, and pipe lines 77 and 82 to the lowering cylinder 14. The elevating cylinder 13 is exhausted through a pipe line 76, the conveyor control valve 62 and the exhaust line 70. The balanced stop valve 79 is open, the skids 8 being in lowered position. Pressure is applied to the pipe draining cylinder 57, through pipe lines 77 and 78, the balanced stop valve 79, and pipe line 81. Pressure is also applied through the pilot line 80 to the conveyor control valve 62, maintaining the control rod 61 in extended position. Pressure is also supplied through the pilot line 87 to the pilot controlled valve 85, maintaining this valve in closed position. At the expiration of a predetermined interval of time, the automatic timing device 74 operates to raise the valve rod 73 and reverse the master control valve 72. Upon such reversal of the master control valve 72, the pipe draining cylinder 57 is exhausted through pipe line 81, the balanced stop valve 79, pipe lines 78 and 77, the master control valve 72 and the exhaust line 71. At the same time, the pilot line 87 leading to the pilot control valve 85 is exhausted, causing the valve 85 to open. Pressure is momentarily maintained on the lowering cylinder 14 through the pipe line 69, the master control valve 72, pipe line 75, the conveyor control valve 62, pipe line 86, the pilot controlled valve 85, and pipe line 84. Thus the conveyor remains at rest, there being pressure on the lowering cylinder 14, and if the pipes are so distributed that there is a tendency to raise the conveyor by reason of an overbalance of weight on the pipe lifting fingers 65, the conveyor will nevertheless be restrained against movement.

As the pipe draining cylinder 57 is exhausted, the tilting arms 54 return from elevated to lowered position, and the two pipes which have been drained at the draining station 3 are returned from inclined to horizontal position. With the lowering of the tilting arm 54, the abutment 60 near the elbow of said arm strikes the valve rod 61 of the conveyor control valve 62, reversing this valve. Thus when the pipes reassume a horizontal position, the conveyor skids 8 are raised in the following manner. Pressure from the supply line 69 passes through the master control valve 72, pipe line 75, conveyor control valve 62, and thence through pipe line 76 to the elevating cylinder 13. At the same time the lowering cylinder 14 is exhausted through pipe line 84, the pilot control valve 85, which is open, pipe line 86, the conveyor control valve 62, and exhaust line 70. As the upward movement of the conveyor skids 8 takes place, the balanced stop valve 79 closes. The control mechanism and pressure lines are then in the condition represented in Fig. X. The elevation of the conveyor skids 8 causes each pipe to be advanced to the next succeeding position. Pipes from the supply station are moved forward one notch on the rails 11 by the conveyor skids 8. Pipes within the heating station 1 are moved forward from one set of rollers 25 to the next set of rollers. The pipe discharged from the final heating stage rolls along the inclined surfaces 32, 33 to a position in advance of the vat 2. The pipe which has been coated in the vat 2 is raised by the pipe-carrying fingers 35 and rolled to the first notch 41 at the pipe draining station 3. The pipe which has previously had one draining at the pipe draining station 3 is rolled to the second notch 41 of the supporting surfaces 40. The pipe which has had two successive drainings at the pipe draining station 3 is rolled along the surfaces 63 to the stop device 64. The pipe previously carried on the lowering arm 65 is lowered to the discharge station 68. Thus when the conveyor skids 8 and pipe carrying arms 35 have attained their fully elevated positions, the parts of the apparatus occupy the positions represented in Figs. V and V—A.

At this point the control switch 90 at the entrance to the vat 2 is actuated, operating the motor and the automatic timing device 74, and reversing the position of the master control valve 72. All of the moving parts of the apparatus are thus returned to their original condition.

It will be observed that the controls for the pipe coating apparatus of this invention are fully automatic in their operation, each movement taking place at the proper time and the apparatus being so coordinated that the pipes are caused to move with step-by-step progression through the various stages of the machine. The factors of guided and timed control of the movement of the pipes, regulated control of the temperature of the coating material in the vat 2, and regulated control of the application of heat at the heating station 1, all mutually contribute toward the primary object of the invention, which is to cause an affinity between the surfaces to be treated and the coating material, and thus the pipes absorb the coating material uniformly and in such manner that it will adhere tenaciously to all parts thereof. When cast iron pipes are coated with bituminous material in this manner, the positive and automatic control of the operations of the machine render it possible to utilize only one immersion, whereas formerly, as before stated, it has been the practice to require two immersions of the pipe in the coating material. Moreover, the use of a conveying apparatus for moving the pipes in spaced relation to each other, and with step-by-step progression through the various stages of the machine, constitutes a substantial improvement over the customary batch method in which a series of pipes are brought to a coating tank in groups without uniformity of treatment to prepare them for immersion in the coating material.

While I have described one example of a coating machine of my invention, and its mode of operation, it will be apparent that various changes may be made in the structure and method of coating herein described and illustrated, all without departing from the spirit of the invention as defined in the annexed claims.

Having thus described my invention, I claim:

1. The method of coating pipes which includes rotating a pipe about its axis with said axis maintained in a fixed position, simultaneously applying heat to the pipe, said heat being applied locally and uniformly from end to end and being regulated to heat the pipe to a predetermined temperature, and then dipping the pipe in coating material heated to substantially the same temperature as that of the pipe.

2. The method of coating pipes which includes rotating a pipe about its axis with said axis maintained in a fixed position while applying heat to the pipe, said heat being applied locally and uniformly from end to end and being regulated to heat said pipe to a temperature just below the volatilization point of the most volatile constituent of the coating material, dipping the pipe in a vat containing the coating material heated to substantially the same temperature as that of the pipe, revolving the pipe in said vat, and then draining the pipe of excess coating material.

3. The method of coating pipes which includes rotating a pipe about its axis at a heating station, with said axis maintained in a fixed position, then transferring the position of the pipe and dipping it in coating material heated to a temperature just below the volatilization point of its most volatile constituent, and then removing the pipe from the coating material, each pipe being transferred from the heating station to the coating material when heated to a temperature substantially equal to the temperature of the coating material.

4. The method of coating pipes which includes moving a series of pipes with step-by-step progression first through a heating station wherein each pipe is rotated about its axis with said axis maintained in a fixed position and while being heated locally and uniformly from end to end, then through a vat containing the coating material, and then to a station wherein each pipe is tilted to an inclined position to drain the same of excess coating material, the step-by-step movement of the pipes from station to station being initiated at the expiration of the time required for coating a pipe in the vat.

5. The method of coating pipe which includes moving a series of pipes with step-by-step progression first through a heating station wherein each pipe on arrival at said station is caused to be rotated about its axis, with said axis maintained in a fixed position and then through a vat containing heated coating material, the movement of the pipes from said heating station to said vat being initiated upon the expiration of the time required for coating a pipe in the vat, and the heating of the pipe being regulated whereby the temperature of the pipe on arrival at the vat is approximately the same as the temperature of the coating material.

6. The method of coating pipe which includes moving a series of pipes to a heating station wherein each pipe on arrival at said station is caused to be rotated about its axis with said axis maintained in a fixed position while heat is applied to the pipe locally and uniformly from end to end, moving the pipe from said heating station to a vat containing heated coating material, and guidedly rolling the pipe into said vat and removing it from said vat in timed relation to the movement of the pipes through said heating station.

7. The method of coating pipes which includes moving a series of pipes in spaced relation to each other and with step-by-step progression, there being a predetermined time interval between each step, first through a heating station wherein they are rotated, each about a fixed axis, during said intervals and while heat is locally applied to their entire surfaces, and then through a station wherein they are immersed in heated coating material during said intervals, said interval being so determined and the heating of the pipes and coating material being so regulated that each pipe is heated to a temperature substantially equal to that of the coating material, and said temperature being maintained just below the volatilization point of the most volatile constituent of the coating material.

LOUIS A. CAMEROTA.